(12) United States Patent
Toyoda et al.

(10) Patent No.: US 10,379,699 B2
(45) Date of Patent: Aug. 13, 2019

(54) INFORMATION PROCESSING APPARATUS, RELAY COMPUTER, INFORMATION PROCESSING SYSTEM, AND INFORMATION PROCESSING PROGRAM

(71) Applicant: Sony Corporation, Minato-ku (JP)

(72) Inventors: Shigeki Toyoda, Kanagawa (JP); Jun Yoshikawa, Kanagawa (JP); Shigeki Wakatani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 728 days.

(21) Appl. No.: 14/538,275

(22) Filed: Nov. 11, 2014

(65) Prior Publication Data

US 2015/0172364 A1 Jun. 18, 2015

(30) Foreign Application Priority Data

Dec. 12, 2013 (JP) ................................. 2013-256738

(51) Int. Cl.
*H04L 29/08* (2006.01)
*G06F 3/0481* (2013.01)
*G06F 3/0486* (2013.01)

(52) U.S. Cl.
CPC ........ *G06F 3/04817* (2013.01); *G06F 3/0486* (2013.01); *G06F 2203/04803* (2013.01)

(58) Field of Classification Search
CPC ............... G06F 3/04817; G06F 3/0486; G06F 2203/04803
See application file for complete search history.

(56) References Cited

U.S. PATENT DOCUMENTS 5,737,531 A * 4/1998 Ehley ...................... H04L 29/06
709/208
5,928,330 A * 7/1999 Goetz .............. H04N 21/23614
348/E5.008

(Continued)

FOREIGN PATENT DOCUMENTS

JP 2010-128527 6/2010
WO WO 2011/126134 A1 10/2011

OTHER PUBLICATIONS

OpenPicus (http://wiki.openpicus.com/index.php/Webserver_dynamic_pages; "Webserver dynamic pp."; pub date: Dec. 6, 2013; last accessed Sep. 28, 2017) (hereinafter openPicus).*

*Primary Examiner* — Jung-Mu T Chuang
(74) *Attorney, Agent, or Firm* — Oblon, McClelland, Maier & Neustadt, L.L.P.

(57) ABSTRACT

There is provided an information processing apparatus including a control unit configured to acquire and output information of an operation screen on a display unit from a relay apparatus storing the information of the operation screen, the relay apparatus being configured to relay at least one moving image from a moving image server, in which the moving image is stored, to a different device via a network, request the thumbnail image to be arranged in the region of the operation screen to the relay apparatus, arrange the acquired thumbnail image in the region if the thumbnail image requested is acquired, and request a thumbnail image the acquisition of which fails until the acquisition is succeeded if the acquisition is failed due to the fact that the thumbnail image is not present.

6 Claims, 10 Drawing Sheets

(56) References Cited

U.S. PATENT DOCUMENTS

| | | | | |
|---|---|---|---|---|
| 5,956,729 A * | 9/1999 | Goetz | G06F 17/30017 | 707/802 |
| 6,088,737 A * | 7/2000 | Yano | G06F 9/505 | 709/224 |
| 6,262,776 B1 * | 7/2001 | Griffits | H04N 5/04 | 348/512 |
| 6,324,574 B1 * | 11/2001 | Gong | H04L 29/06 | 709/218 |
| 6,574,629 B1 * | 6/2003 | Cooke, Jr. | G06F 17/30017 | |
| 6,891,566 B2 * | 5/2005 | Marchese | G06F 17/3025 | 348/211.12 |
| 6,990,483 B2 * | 1/2006 | Wagner | G06F 17/30011 | |
| 7,123,372 B2 * | 10/2006 | Yamada | G06K 15/00 | 358/1.15 |
| 7,475,358 B2 * | 1/2009 | Anzelde | G06F 9/451 | 715/772 |
| 7,523,408 B2 * | 4/2009 | Barrios | H04L 29/06 | 715/748 |
| 7,664,861 B2 * | 2/2010 | Guntupalli | H04L 12/1818 | 709/203 |
| 7,908,351 B2 * | 3/2011 | Yoshida | H04L 41/0663 | 358/1.15 |
| 7,930,273 B1 * | 4/2011 | Clark | G06F 8/71 | 707/638 |
| 8,005,961 B2 * | 8/2011 | Tanimoto | H04L 12/4604 | 709/202 |
| 8,082,319 B2 * | 12/2011 | Disario | G06F 17/3089 | 709/217 |
| 8,270,821 B2 * | 9/2012 | Chen | H04N 5/76 | 386/353 |
| 8,356,084 B2 * | 1/2013 | Yamamoto | G06F 3/1454 | 709/217 |
| 8,375,381 B1 * | 2/2013 | Clark | G06F 8/71 | 717/170 |
| 8,578,266 B2 * | 11/2013 | Davison | G06F 17/30893 | 715/234 |
| 8,595,625 B2 * | 11/2013 | Hung | H04L 41/22 | 709/220 |
| 8,619,051 B2 * | 12/2013 | Lacroix | G06F 3/016 | 345/156 |
| 8,645,549 B2 * | 2/2014 | Arima | H04L 29/12783 | 709/227 |
| 8,799,410 B2 * | 8/2014 | Fiatal | H04L 51/24 | 709/203 |
| 8,863,183 B2 * | 10/2014 | Kutaragi | H04N 21/2743 | 382/118 |
| 8,947,701 B2 * | 2/2015 | Yabe | G06F 3/1211 | 358/1.15 |
| 9,098,457 B2 * | 8/2015 | Towstopiat | G06F 11/1471 | |
| 9,204,198 B2 * | 12/2015 | Kutaragi | H04N 21/2743 | |
| 9,238,144 B2 * | 1/2016 | Greene | A61N 1/37276 | |
| 9,477,388 B2 * | 10/2016 | Iwase | G06F 3/04812 | |
| 9,480,847 B2 * | 11/2016 | Greene | A61N 1/37276 | |
| 9,600,069 B2 * | 3/2017 | Publicover | G06F 3/013 | |
| 2002/0049853 A1 * | 4/2002 | Chu | H04L 29/06 | 709/237 |
| 2002/0103901 A1 * | 8/2002 | Yoshida | H04L 41/0663 | 709/224 |
| 2003/0040936 A1 * | 2/2003 | Nader | H04M 15/00 | 715/700 |
| 2003/0079179 A1 * | 4/2003 | Brown | G06F 17/30864 | 715/205 |
| 2004/0006562 A1 * | 1/2004 | Wagner | G06F 17/30011 | |
| 2004/0109063 A1 * | 6/2004 | Kusaka | H04N 1/00477 | 348/207.1 |
| 2004/0243697 A1 * | 12/2004 | Otsuka | H04L 29/06 | 709/223 |
| 2004/0243778 A1 * | 12/2004 | Barrios | H04L 29/06 | 711/165 |
| 2006/0173940 A1 * | 8/2006 | Guntupalli | H04L 12/1818 | |
| 2006/0174041 A1 * | 8/2006 | Satomi | G06F 21/10 | 710/67 |
| 2006/0206866 A1 * | 9/2006 | Eldrige | G05B 15/02 | 717/122 |
| 2007/0159651 A1 * | 7/2007 | Disario | G06F 17/3028 | 358/1.15 |
| 2007/0245344 A1 * | 10/2007 | Kumagai | G06F 8/65 | 717/174 |
| 2008/0001945 A1 * | 1/2008 | Kashito | G11B 27/034 | 345/418 |
| 2008/0018496 A1 * | 1/2008 | Tanner | G01S 5/0027 | 340/992 |
| 2008/0025691 A1 * | 1/2008 | Kinoshita | H04N 9/8042 | 386/278 |
| 2008/0040642 A1 * | 2/2008 | Furukawa | G06F 11/327 | 714/746 |
| 2008/0122734 A1 * | 5/2008 | Sudo | G06F 17/30056 | 345/1.3 |
| 2009/0003731 A1 * | 1/2009 | Nitta | G06F 3/1423 | 382/298 |
| 2009/0037835 A1 * | 2/2009 | Goldman | G06F 8/65 | 715/771 |
| 2009/0132921 A1 * | 5/2009 | Hwangbo | G06F 3/0482 | 715/716 |
| 2009/0237728 A1 * | 9/2009 | Yamamoto | G06F 3/1454 | 358/1.15 |
| 2010/0067583 A1 * | 3/2010 | Suh | H04H 20/28 | 375/240.26 |
| 2010/0081472 A1 * | 4/2010 | Silverbrook | B41J 3/44 | 455/556.1 |
| 2010/0208300 A1 * | 8/2010 | Kamasuka | H04N 1/00347 | 358/1.15 |
| 2010/0332512 A1 * | 12/2010 | Shpits | G06F 17/30274 | 707/759 |
| 2011/0035431 A1 * | 2/2011 | Geary | G06F 17/30899 | 709/203 |
| 2011/0153728 A1 * | 6/2011 | Einarsson | H04W 52/0229 | 709/203 |
| 2011/0191474 A1 * | 8/2011 | Fiatal | H04L 51/24 | 709/225 |
| 2011/0264811 A1 * | 10/2011 | Arima | H04L 29/12783 | 709/227 |
| 2011/0310043 A1 * | 12/2011 | Lacroix | G06F 3/016 | 345/173 |
| 2012/0121235 A1 * | 5/2012 | Terasaki | G11B 27/105 | 386/241 |
| 2013/0036438 A1 * | 2/2013 | Kutaragi | H04N 21/2743 | 725/38 |
| 2013/0042196 A1 * | 2/2013 | Yamanaka | G06F 3/0484 | 715/772 |
| 2013/0053657 A1 * | 2/2013 | Ziarno | A61B 1/00016 | 600/304 |
| 2013/0124652 A1 * | 5/2013 | Kim | H04L 51/32 | 709/206 |
| 2013/0132470 A1 * | 5/2013 | Vardin | G06F 15/173 | 709/203 |
| 2013/0215894 A1 * | 8/2013 | Maezawa | H04L 29/06 | 370/392 |
| 2013/0247117 A1 * | 9/2013 | Yamada | G08C 17/02 | 725/93 |
| 2013/0263056 A1 * | 10/2013 | Son | G09G 5/14 | 715/838 |
| 2013/0331119 A1 * | 12/2013 | Vaccari | H04W 4/02 | 455/456.1 |
| 2014/0108944 A1 * | 4/2014 | Inami | G06F 17/3002 | 715/738 |
| 2014/0126882 A1 * | 5/2014 | Seto | H04N 9/8042 | 386/241 |
| 2014/0189769 A1 * | 7/2014 | Okamoto | H04N 21/23418 | 725/116 |
| 2014/0195979 A1 * | 7/2014 | Branton | G06F 3/0488 | 715/834 |
| 2014/0266774 A1 * | 9/2014 | Greene | A61N 1/37276 | 340/870.01 |
| 2014/0267871 A1 * | 9/2014 | Baek | H04N 5/2258 | 348/333.05 |
| 2014/0278408 A1 * | 9/2014 | Park | G06F 3/0488 | 704/235 |

(56) References Cited

U.S. PATENT DOCUMENTS

| | | | | |
|---|---|---|---|---|
| 2014/0298234 A1* | 10/2014 | Iwase | ................. | G06F 3/04812 |
| | | | | 715/771 |
| 2014/0380397 A1* | 12/2014 | Kutaragi | ............ | H04N 21/2743 |
| | | | | 725/116 |
| 2015/0302889 A1* | 10/2015 | Chung | ................. | G11B 27/034 |
| | | | | 715/723 |
| 2015/0326570 A1* | 11/2015 | Publicover | ............ | G06T 19/006 |
| | | | | 726/4 |
| 2015/0379741 A1* | 12/2015 | Obayashi | ............ | H04N 1/6058 |
| | | | | 345/590 |
| 2016/0089543 A1* | 3/2016 | Greene | .............. | A61N 1/37276 |
| | | | | 607/60 |
| 2016/0089544 A1* | 3/2016 | Greene | .............. | A61N 1/37276 |
| | | | | 607/60 |
| 2016/0253076 A1* | 9/2016 | Lee | ......................... | G06F 3/041 |
| | | | | 455/566 |
| 2017/0180937 A1* | 6/2017 | Vaccari | ................ | H04W 4/023 |
| 2017/0206417 A1* | 7/2017 | Aoyama | ............ | G06K 9/00671 |
| 2017/0347227 A1* | 11/2017 | Stattenfield | ........... | H04W 76/14 |

\* cited by examiner

```
<jsp:useBean id="hello" class="com.sony.HelloBean" />
<html>
<body>
    <h2>Hello <%=hello.getName()%>!</h2>
```

Specification of image
```
            <img class="lazy1" src="img/1x1.gif" data-original="img/02.jpg" width="800" height="800">
            <img class="lazy2" src="img/1x1.gif" data-original="img/car1.jpg" width="1020" height="765">
            <img class="lazy3" src="img/1x1.gif" data-original="img/car2.jpg" width="1020" height="765">
            <img class="lazy4" src="img/1x1.gif" data-original="img/car3.jpg" width="1020" height="765">
            <img class="lazy5" src="img/1x1.gif" data-original="img/car4.jpg" width="1020" height="765">
            <img class="lazy6" src="img/1x1.gif" data-original="img/car5.jpg" width="1020" height="765">
            <img class="lazy7" src="img/1x1.gif" data-original="img/car6.jpg" width="1020" height="765">
<script src="//ajax.googleapis.com/ajax/libs/jquery/1.8.1/jquery.min.js"></script>
<script src="js/jquery.lazyload.min.js"></script>
        <script type="text/javascript"> function loadThumbImage( thumbimg ){
                var gazou = new Image();
                var ReFresh = 0;
                gazou.src = $(thumbimb).attr("data-original") ;
                if((gazou.width == 0)||(gazou.height == 0)) {
```

Image generation waiting processing
```
                        var stop = setInterval(function (){
                                if(gazou.complete){
                                        if((gazou.width == 0)||(gazou.height == 0)) {
                                                // No Image !! ReTry !
                                                gazou.src = $(thumbimg).attr("data-original") ;
                                                ReFresh = 1;
                                        }else {
                                                $(thumbimg).lazyload({
                                                        effect: 'fadeIn',
                                                        effectspeed: 2000
                                                });
//                                              if(ReFresh == 1){
                                                        $(thumbimg).each(function() {
                                                                // LazyLoad Inside Self Trigger Call !
                                                                $(this).trigger("appear");
                                                        });
//                                              }
                                                clearInterval(stop);
                                        }
                                }else{

}
                        },1000);

}else {
```

Delay reading processing in case where image is present
```
                        $(thumbimg).lazyload({
                                effect: 'fadeIn',
                                effectspeed: 2000
                        });
//                      if(ReFresh == 1){
                                $(thumbimg).each(function() {
                                        // LazyLoad Inside Self Trigger Call !
                                        $(this).trigger("appear");
                                });
//                      }
                }
        } if (window.Worker){
        } else {
                window.alert("This Browser cannot useWeb Workers.");
        }
        loadThumbImage("img.lazy1") ;
        loadThumbImage("img.lazy2") ;
        loadThumbImage("img.lazy3") ;
        loadThumbImage("img.lazy4") ;
        loadThumbImage("img.lazy5") ;
        loadThumbImage("img.lazy6") ;
        loadThumbImage("img.lazy7") ;

</script>
        </body>
</html>
```

FIG.8

INFORMATION PROCESSING APPARATUS, RELAY COMPUTER, INFORMATION PROCESSING SYSTEM, AND INFORMATION PROCESSING PROGRAM

CROSS REFERENCE TO RELATED APPLICATIONS

This application claims the benefit of Japanese Priority Patent Application JP 2013-256738 filed Dec. 12, 2013, the entire contents of which are incorporated herein by reference.

BACKGROUND

The present technology relates to an information processing apparatus that handles information of a screen described in a structured language, to a relay computer, to an information processing system, and to an information processing program.

There is a delay reading technique of, in the case where a document described in a structured language such as a hyper text markup language (HTML) is displayed by a Web browser, displaying sections other than images of the document and then reading and displaying the images of the document for increasing the responsivity in viewing (e.g., see Japanese Patent Application Laid-open No. 2010-128527).

There is also a technique of, in the case where a plurality of moving images are handled, generating moving image thumbnails from the moving images in real time for increasing listing properties (e.g., see WO 2011/126134).

SUMMARY

However, a prerequisite of the delay reading technique is that the image contained in the document is already present in the Web server. If the image is not present at the point of time of delay reading, it results in an error.

As just described, displaying the HTML file by the Web browser is inefficient.

In view of the above-mentioned circumstances, it is desirable to provide an information processing apparatus, a relay computer, an information processing system, and an information processing program in which the display is made efficient.

The information processing apparatus according to the embodiment of the present technology includes a control unit configured to acquire and output information of an operation screen on a display unit from a relay apparatus storing the information of the operation screen, the relay apparatus being configured to relay at least one moving image from a moving image server, in which the moving image is stored, to a different device via a network, the operation screen being used to operate the relay apparatus and including a region for arranging a thumbnail image of the moving image, the information being described in a structure language, request the thumbnail image to be arranged in the region of the operation screen to the relay apparatus, arrange the acquired thumbnail image in the region if the thumbnail image requested is acquired, and request a thumbnail image the acquisition of which fails until the acquisition is succeeded if the acquisition is failed due to the fact that the thumbnail image is not present.

In the information processing apparatus according to the embodiment of the present technology, the control unit may be configured to output, if the acquisition is failed, an alternative image to the operation screen until the acquisition is succeeded and the acquired thumbnail image is outputted to the operation screen.

In the information processing apparatus according to the embodiment of the present technology, the control unit may be configured to request a thumbnail image the acquisition of which fails, at time intervals defined in advance.

In the information processing apparatus according to the embodiment of the present technology, the control unit may start the relay based on a GUI operation defined in advance with respect to the thumbnail image on the operation screen.

The relay apparatus of relaying at least one moving image from a moving image server storing the moving image to a different device according to the embodiment of the present technology is configured to determine whether or not a thumbnail image to be arranged in a region of an operation screen is present, and generate the thumbnail image from the moving image if it is not present when information of an operation screen described in a structured language and including a first region for arranging a thumbnail image of the moving image is outputted.

In the relay apparatus according to the embodiment of the present technology, the thumbnail image may be generated and stored from the moving image when the moving image is relayed between the moving image server and the different device.

In the relay apparatus according to the embodiment of the present technology, the different device may be a removable recording medium to the relay apparatus.

In the relay apparatus according to the embodiment of the present technology, the different device may be a live video server configured to store a moving image for live broadcasting that is connectable to the relay apparatus via a network.

In the relay apparatus according to the embodiment of the present technology, the operation screen may include a second region in which a list of moving images stored in the moving image server is displayed, and a third region configured to display a list of moving images stored in the different device, and a fourth region in which a relay state of the moving image is displayed.

In the relay apparatus according to the embodiment of the present technology, the fourth region may include at least one progress display unit configured to indicate a progress on the difference device in a relay processing per moving image.

The information processing system according to the embodiment of the present technology includes a moving image server storing at least one moving image, a relay apparatus configured to relay the moving image from a moving image server to a different device and to store information of an operation screen being used to operate the relay apparatus and including a region for arranging a thumbnail image of the moving image, the information being described in a structured language; and an information processing apparatus including a control unit configured to acquire and output the information of the operation screen on a display unit from the relay apparatus, request the thumbnail image to be arranged in the region of the operation screen to the relay apparatus, arrange the acquired thumbnail image in the region if the thumbnail image requested is acquired, and request a thumbnail image the acquisition of which fails until the acquisition is succeeded if the acquisition is failed due to the fact that the thumbnail image is not present.

The information processing program for causing a computer to function as a control unit according to the embodiment of the present technology is configured to acquire and output information of an operation screen on a display unit from a relay apparatus storing the information of the operation screen, the relay apparatus being configured to relay at least one moving image from a moving image server, in which the moving image is stored, to a different device via a network, the operation screen being used to operate the relay apparatus and including a region for arranging a thumbnail image of the moving image, the information being described in a structured language, request the thumbnail image to be arranged in the region of the operation screen to the relay apparatus, arrange the acquired thumbnail image in the region if the thumbnail image requested is acquired, and request a thumbnail image the acquisition of which fails until the acquisition is succeeded if the acquisition is failed due to the fact that the thumbnail image is not present.

As described above, according to the embodiments of the present technology, the display can be made efficient.

Note that effects described herein are not necessarily limited and may be any effect described in the present disclosure.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a sequence diagram for describing a specific example of typical delay reading in a Web browser 10a;

FIG. 6 is a sequence diagram for describing a specific example of delay reading improved by the embodiment of the present technology in the Web browser 10a;

FIG. 8 is a simplified description example of the HTML file for carrying out improved delay reading in the Web browser 10a;

DETAILED DESCRIPTION OF EMBODIMENTS

Hereinafter, an embodiment of the present disclosure will be described with reference to the drawings.

[Configuration of Information Processing System]

Figure 1:
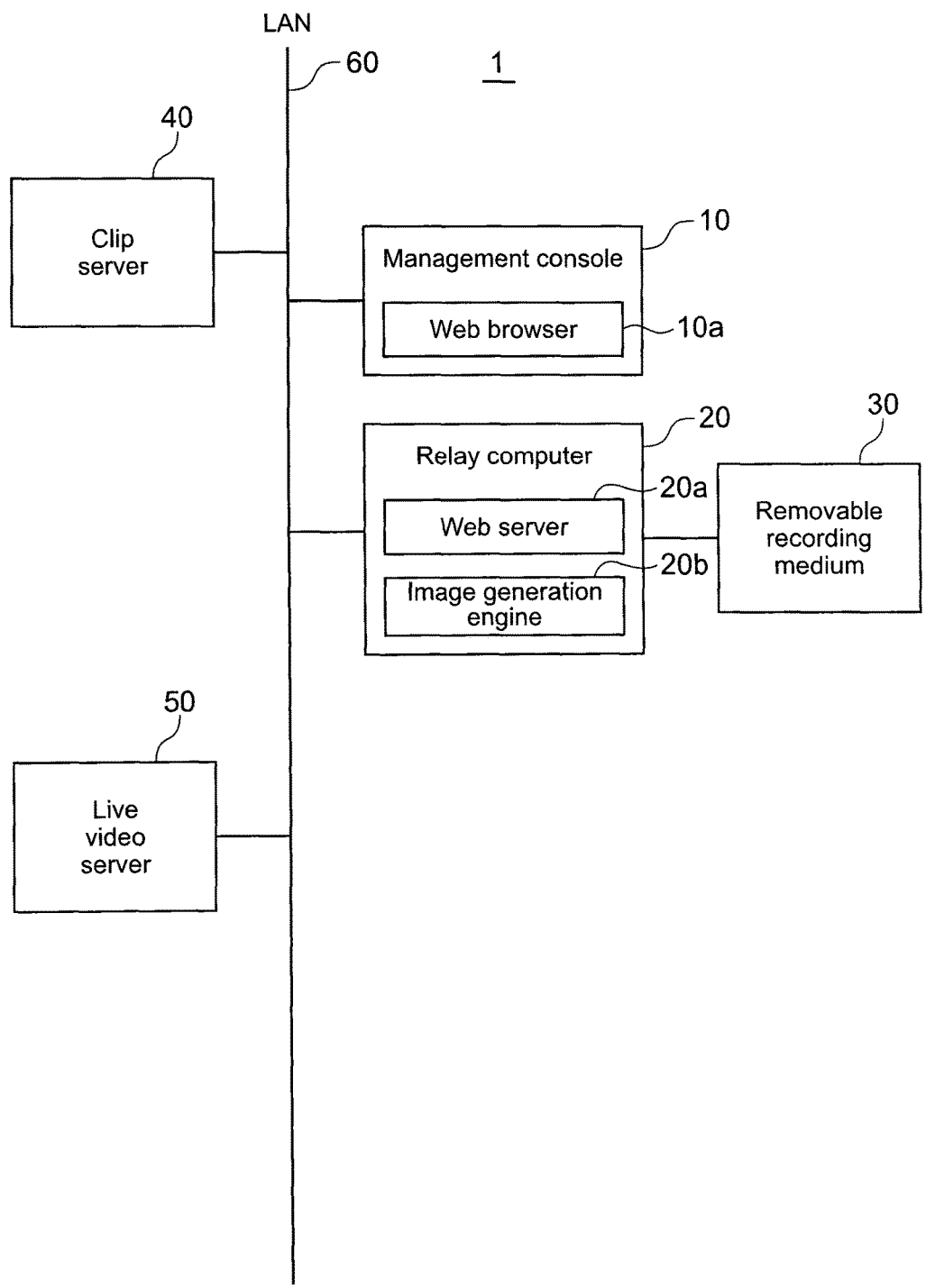
FIG. 1 is a configuration diagram of an information processing system according to an embodiment of the present technology.

First, a configuration of an information processing system according to an embodiment of the present technology will be described. FIG. 1 is a configuration diagram of the information processing system according to the embodiment of the present technology.

An information processing system 1 includes a management console 10 (information processing apparatus), a relay computer 20 (relay apparatus), a clip server 40 (moving image server), and a local area network (LAN) 60. Note that a removable recording medium 30 (different device) and a live video server 50 (different device) may be connected to the information processing system 1.

The management console 10 includes a Web browser 10a (control unit). The user issues a request to output information of an operation screen to the relay computer 20 via the Web browser 10a.

It is possible to operate and manage the relay computer 20 based on an operation screen of the relay computer 20 that is constituted of thumbnail images generated based on HTML documents or moving images received from the relay computer 20. The configuration of the management console 10 will be described later.

The relay computer 20 relays a moving image when a clip (moving image) is copied or moved among the removable recording medium 30, the clip server 40, and the live video server 50. Here, the clip means a segment of a video material captured and not yet edited.

Further, the relay computer 20 includes a Web server 20a and an image generation engine 20b. The Web server 20a is used for transmitting the operation screen of the relay computer 20 to the management console 10 in the form of the HTML document.

The image generation engine 20b is used for generating a thumbnail image from a moving image. Note that the thumbnail images described herein is images for representing the contents of the moving image, and may be constituted of a single still image or may be a short moving image that is a digest of the original moving image.

The image generation engine 20b generates the thumbnail image at two timings. One of the two timings is a timing at which the relay computer 20 relays the moving image and the moving image actually passed through the relay computer 20. At this time, the thumbnail images of the moving image are generated and stored in the relay computer 20.

The other timing is a timing at which the user displays the operation screen on the management console 10 for copying or moving the moving image among the removable recording medium 30, the clip server 40, and the live video server 50.

At this time, a list of moving images retained in devices serving as moving (copy) source and moving (copy) destination is displayed as thumbnail images on the operation screen. However, some of moving images that has not yet been passed through the relay computer 20 does not yet have thumbnail images. Therefore, the thumbnail image is generated with respect to the moving images without the thumbnail images at a timing at which they are displayed in the operation screen. The configuration of the relay computer 20 will be described later.

The removable recording medium 30 is constituted of, for example, a hard disk drive (HDD) and a phase change rewritable disk (PD), a phase change recording disk, connected to the relay computer 20 via a universal serial bus (USB). The removable recording medium 30 is used for supplying the moving image to the clip server 40 and taking out the moving image of the clip server 40.

The clip server 40 stores the moving image (clip) and supplies the moving image to the removable recording medium 30 or the live video server 50 via the LAN 60 depending on needs. The moving image is stored in Material exchange Format (MXF) and does not include the thumbnail images in itself. Therefore, as described above, it is necessary to additionally generate and store the thumbnail images. Note that the clip server 40 is also capable of receiving and transmitting the moving image from/to other broadcasting device via a serial digital interface (SDI) (not shown).

The live video server 50 is a server that supplies the moving image literally in a live. The moving image is supplied from the clip server 40 via the LAN 60 or supplied from the other broadcasting devices via an SDI (not shown).

The LAN 60 is constituted of 10 gigabit Ethernet (registered trademark) (10 GbE) or the like and is capable of transmitting the moving image at high speed.

The configuration of the information processing system according to the embodiment of the present technology has been described above.

[Configuration of Management Console 10]

Figure 2:
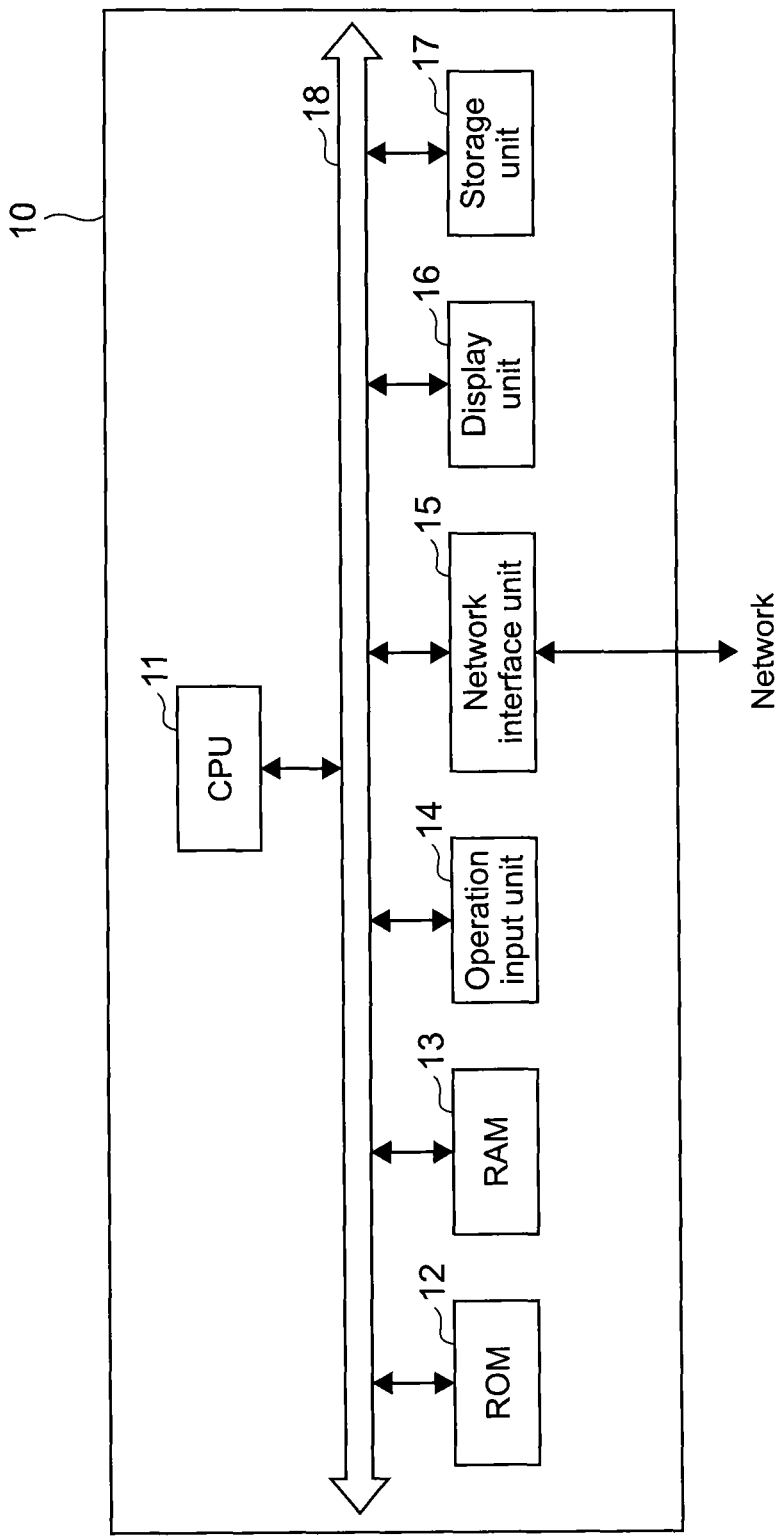
FIG. 2 is a block diagram in the case where a management console 10 is configured by a generally-used computer.

Next, a hardware configuration of the management console 10 will be described. The management console 10 may be configured by dedicated hardware and software or may be configured by the generally-used computer. A block diagram in which the management console 10 is configured by the generally-used computer is shown in FIG. 2.

As shown in the figure, the management console 10 includes a central processing unit (CPU) 11, a read only memory (ROM) 12, a random access memory (RAM) 13, an operation input unit 14, a network interface unit 15, a display unit 16, and a storage unit 17. These blocks are connected via a bus 18.

The ROM 12 fixedly stores a plurality of programs and data items such as firmware for executing various types of processing. The RAM 13 is used as a working area of the CPU 11 and temporarily stores an operating system (OS), various applications being executed, and various kinds of data being processed.

The storage unit 17 is, for example, a hard disk drive (HDD), a flash memory, and other nonvolatile memories. The OS and various applications are stored in the storage unit 17.

The network interface unit 15 is associated with the LAN 60 for receiving and transmitting information from/to the relay computer 20. The network interface unit 15 receives the HTML file that configures the operation screen from the relay computer 20 and transmits an operation instruction to the relay computer 20.

The CPU 11 develops a program of a plurality of programs stored in the ROM 12 and the storage unit 17, which corresponds to a command issued from the operation input unit 14, into the RAM 13. The CPU 11 appropriately controls the display unit 16 and the storage unit 17 according to the developed program. By this control, the Web browser 10a is realized as functional blocks.

The operation input unit 14 is, for example, a pointing device such as a mouse, a keyboard, a touch panel, and another operation apparatus.

The display unit 16 is, for example, a liquid-crystal display, an electro-luminescence (EL) display, a plasma display, or a cathode ray tube (CRT) display. The display unit 16 may be incorporated in the management console 10 or may be externally connected.

The configuration of the management console 10 has been described above.

[Configuration of Relay Computer 20]

Figure 3:
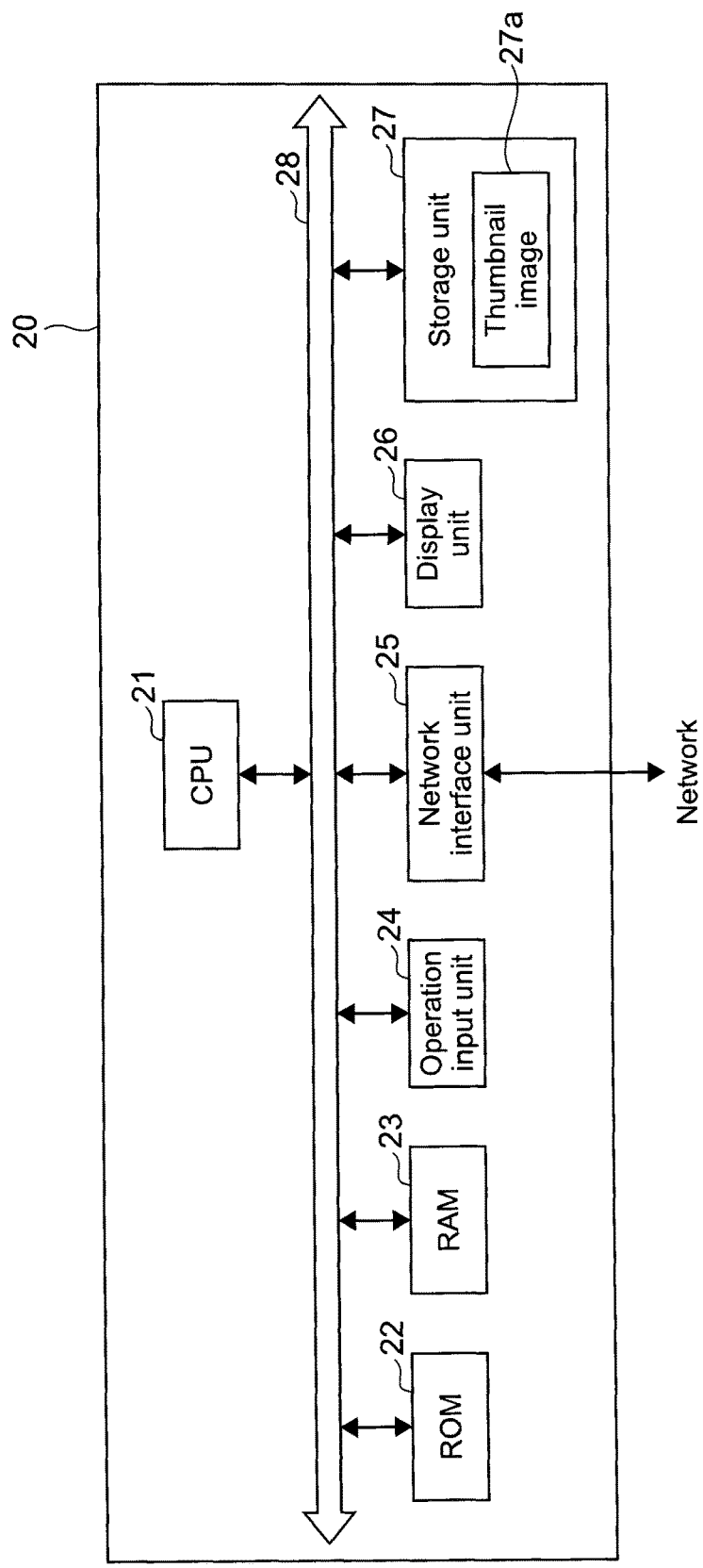
FIG. 3 is a block diagram in the case where the relay computer 20 is configured by the generally-used computer.

Next, a hardware configuration of the relay computer 20 will be described. The relay computer 20 may be configured by dedicated hardware and software or may be configured by the generally-used computer. A block diagram in the case where the relay computer 20 is configured by the generally-used computer is shown in FIG. 3.

As shown in the figure, the relay computer 20 includes a CPU 21, a ROM 22, a RAM 23, an operation input unit 24, a network interface unit 25, a display unit 26, and a storage unit 27. The respective blocks are connected to one another via a bus 28.

The CPU 21 develops a program corresponding to an instruction of a plurality of programs stored in the ROM 22 and the storage unit 27, which is issued from the operation input unit 24 or the management console 10, into the RAM 23. The CPU 21 appropriately controls the respective units such as the network interface unit 25, the display unit 26, and the storage unit 27 according to the developed program. By this control, the Web server 20a, the image generation engine 20b, and the like are realized as functional blocks.

Further, the thumbnail images generated by the image generation engine 20b are stored in the storage unit 27. The thumbnail image may be provided with an identifier associated with the moving image in order to clarify from which of the moving images the thumbnail image is generated.

Note that the functions of constituent members other than the CPU 21 and the storage unit 27 are the same as those of the management console 10, and hence descriptions thereof will be omitted.

The configuration of the relay computer 20 has been described.

[Example of Operation Screen]

Figure 4:
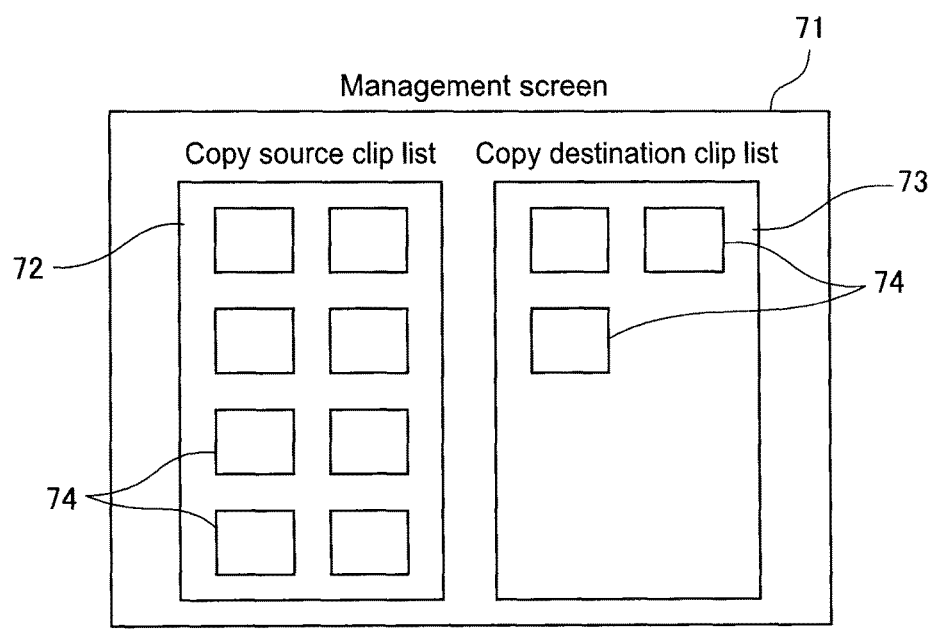
FIG. 4 is an example of an operation screen of the relay computer 20, which is displayed on a display unit 16 of the management console 10.

Next, an example of the operation screen of the relay computer 20, which is displayed on the display unit 16 of the management console 10, will be described. FIG. 4 shows an example of the relay computer 20 of the operation screen 71, which is displayed on the display unit 16 of the management console 10.

This example is an operation screen 71 for copying the moving image from the clip server 40 to the different device (moving image removable recording medium 30 or live video server 50).

As shown in the figure, a region 72 in which a list of clips included in the copy source device is present on the left-hand side of the operation screen 71 and a region 73 in which a list of clips included in the copy destination device is present on the right-hand side of the operation screen. Thumbnail images 74 of the moving image are arranged in these regions 72 and 73.

As a method of providing an instruction to copy the moving image to the relay computer 20, a graphical user interface (GUI) operation defined in advance, for example, a method of dragging and dropping the thumbnail image 74 in the region 72 on the left-hand side of the operation screen 71 to the region 73 on the right-hand side of the operation screen 71 may be used.

Note that, although this figure shows the configuration in which the thumbnail images 74 are displayed in both of the copy source and copy destination, it is not limited thereto and a configuration in which the thumbnail images 74 are displayed only in either one of them may be employed.

Note that a clip ID, a clip name, a reproduction time of the clip, date and time generation of the clip, and the like may be displayed on the operation screen 71 in addition to the thumbnail images 74.

The example of the operation screen of the relay computer 20, which is displayed on the display unit 16 of the management console 10, has been described above.

[Specific Example of Delay Reading]

Figure 5:
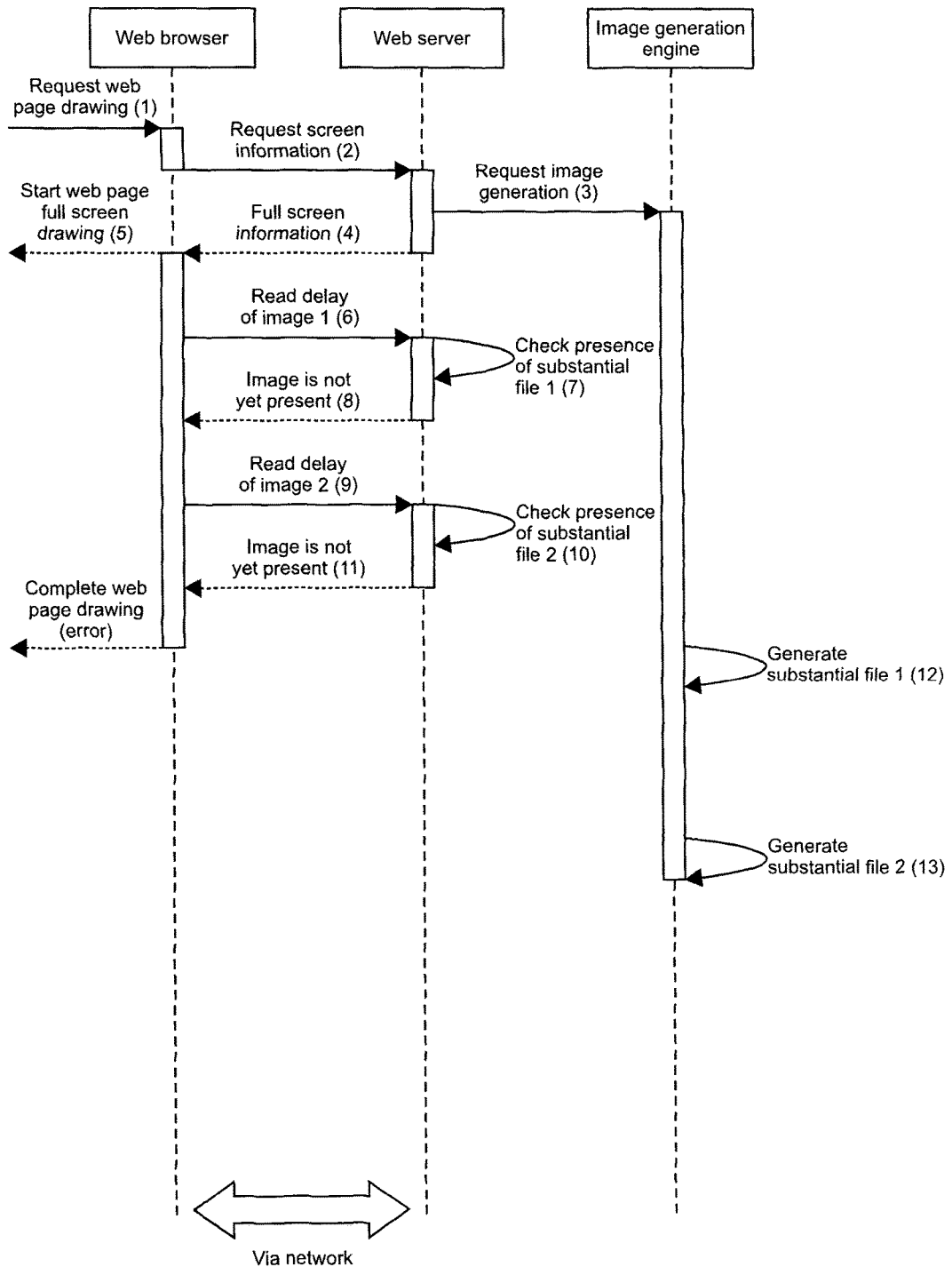

Next, a specific example of typical delay reading in the Web browser 10a will be described. FIG. 5 is a sequence diagram for describing a specific example of typical delay reading in the Web browser 10a.

(1) First, the user issues, with respect to the Web browser 10a, a Web page drawing request for displaying the operation screen.

(2) Subsequently, the Web browser 10a requests, from the Web server 20a, screen information (HTML file) for drawing the operation screen.

(3) Subsequently, the Web server 20a determines whether or not the thumbnail image displayed on the operation screen is present, and sends an image generation request of the thumbnail image to the image generation engine 20b if it is not present. The image generation engine 20b generates the thumbnail images from the moving image according to the image generation request. Note that a part of the moving image that is a source for generating the thumbnail images may be acquired from the clip server 40 or the different device via the LAN 60.

(4) Subsequently, the Web server 20a sends an HTML file (full-screen information) describing the operation screen to the Web browser 10a.

(5) Subsequently, the Web browser 10a starts, based on the HTML file received from the Web server 20a, drawing with respect to the operation screen other than the portion of the thumbnail images.

(6) Subsequently, the Web browser 10a performs delay reading of the thumbnail images for displaying the thumbnail image in each of regions (first region) in which the thumbnail images are displayed in the operation screen. Specifically, the Web browser 10a sends a request to acquire a first thumbnail image (image 1) to the Web server 20a.

(7) Subsequently, the Web server 20a checks, based on the request to acquire the image 1, the presence of the substantial file 1 for sending back a substantial file 1 that is a substance of the image 1.

(8) It is assumed that the Web server 20a tries to send the substantial file 1 but generation of this file is not completed and does not exist. In this case, the Web server 20a sends back to an error that the substantial file 1 is not present to the Web browser 10a.

(9) Subsequently, the Web browser 10a performs delay reading of a next thumbnail image (image 2). Specifically, the Web browser 10a sends a request to acquire the image 2 to the Web server 20a.

(10) Subsequently, the Web server 20a checks, based on the request to acquire the image 2, the presence of a substantial file 2 that is a substance of the image 2 for sending back to the substantial file 2.

(11) Also here, the Web server 20a assumes a case where the substantial file 2 is not yet present. Thus, the Web server 20a sends back an error that the substantial file 2 is not present to the Web browser 10a.

(12) At this point of time, generation of the substantial file 1 is completed.

(13) At this point of time, generation of the substantial file 2 is completed.

The above is the specific example of typical delay reading in the Web browser 10a. As can be seen from this example, in the case where the generation of the thumbnail image is not completed by the timing of delay reading, the error message indicating that the thumbnail image is not present in the Web browser 10a and the drawing of the operation screen is terminated.

For displaying the operation screen including newly generated thumbnail images, it is necessary to perform the Web page drawing request for displaying the operation screen again and draw the entire operation screen again in (1).

[Specific Example of Delay Reading Improved by Embodiment of Present Technology]

Figure 6:
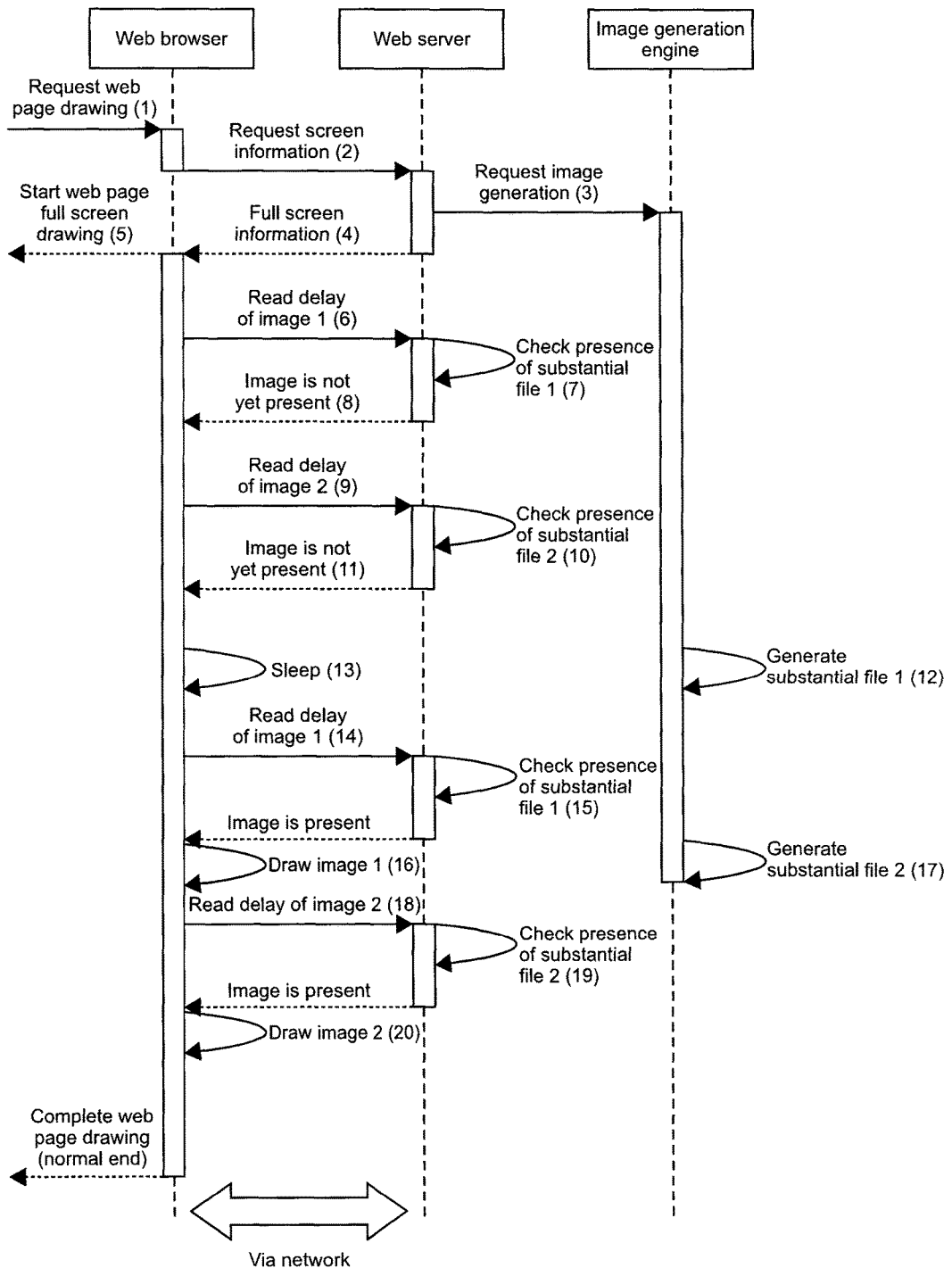

Next, a specific example of delay reading improved by the embodiment of the present technology in the Web browser 10a will be described. FIG. 6 is a sequence diagram for describing a specific example of delay reading improved by the embodiment of the present technology in the Web browser 10a.

Note that, in this figure, processing from (1) to (12) is the same as the above-mentioned specific example of typical delay reading, and hence a description thereof will be omitted.

(13) Subsequently, even if the Web browser 10a cannot acquire the thumbnail image and fails to acquire the image due to the fact that the substantial file is not present, the Web browser 10a does not display it as an error and terminate drawing of the operation screen. The Web browser 10a sleeps for waiting for the completion of the generation of the thumbnail image.

(14) Subsequently, the Web browser 10a performs delay reading of the thumbnail image that cannot be read due to the absence of the substantial file 1 in (8). Specifically, the Web browser 10a sends a request to acquire the image 1 to the Web server 20a.

(15) Subsequently, the Web server 20a checks the presence of a substantial file 1 that is a substance of the image 1 for sending back the substantial file 1 based on the request to acquire the image 1.

(16) The substantial file 1 has already been generated and is present, and hence the Web server 20a sends back the image file to the Web browser 10a. Then, based on the sent-back image file, the Web browser 10a draws the thumbnail image.

(17) At this point of time, the generation of the substantial file 2 is completed.

(18) Subsequently, the Web browser 10a performs delay reading of the thumbnail image that cannot be read due to the absence of the substantial file 2 in (11). Specifically, the Web browser 10a sends a request to acquire the image 2 to the Web server 20a.

(19) Subsequently, the Web server 20a checks the presence of a substantial file 2 that is a substance of the image 2 for sending back the substantial file 2 based on the request to acquire the image 2.

(20) The substantial file 2 has already been generated and is present, the Web server 20a sends back the image file to the Web browser 10a. Then, based on the sent-back image file, the Web browser 10a draws the thumbnail image.

The above is the specific example of delay reading improved by the embodiment of the present technology. Note that, if the generation of the substantial file 2 is not yet completed at the point of time of processing (19), processing returns to processing (13) and sleeps and then, delay reading of the substantial file 2 is performed. That is, delay reading is regularly performed at time intervals defined in advance.

[Display of Alternative Image]

Figure 7:
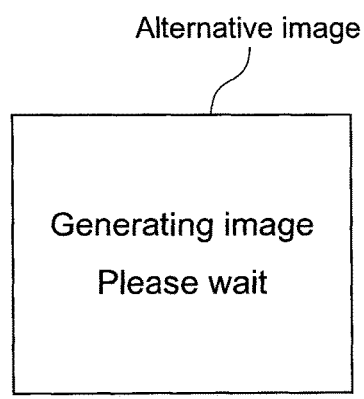
FIG. 7 is an example of the alternative image.

In the case where the above-mentioned processes, in the case where the thumbnail images to be displayed on the operation screen is being generated, an alternative image may be displayed in a position in which the thumbnail image is displayed in the operation screen. FIG. 7 is an example of the alternative image. Due to such display, even if the thumbnail images are displayed, the user can understand that it is not an error due to failure in reading the thumbnail image and the thumbnail images are being generated and will be displayed at a certain point of time if the user waits.

As the alternative image, for example, a message or a figure for indicating that the thumbnail images are being currently generated can be displayed.

[Description Example of HTML]

Here, a description example of the HTML file for carrying out improved delay reading in the Web browser 10*a* will be described. FIG. 8 is a simplified description example of the HTML file for carrying out improved delay reading in the Web browser 10*a*.

As first shown in the figure, in the section of "Specification of image," locations in which the thumbnail images to be displayed on the operation screen are placed are specified.

In the case where the thumbnail images are not present, the section of "Image generation waiting processing," the sleep is performed for a period of time defined in advance.

In the case where the thumbnail images are present, in the section of "Delay reading processing in case where image is present," delay reading processing is performed.

The description example of the HTML file for carrying out improved delay reading in the Web browser 10*a* has been described above.

[Improvement Points by Embodiment of Present Technology]

As described above, in the embodiment of the present technology, delay reading processing is improved by adding "image generation waiting processing" to the HTML file and generating at the same time thumbnail images not yet present using a request of the HTML file from the Web browser 10*a* as a trigger on the side of the Web server 20*a*.

Due to this improvement, even if the thumbnail images constituting the operation screen are not yet present, it is not considered as an error. By waiting for generation of the thumbnail images and drawing only positions of the thumbnail images that had not been present again without drawing the entire operation screen again, drawing of the operation screen can be completed.

[Specific Example of Operation Screen]

Figure 9:
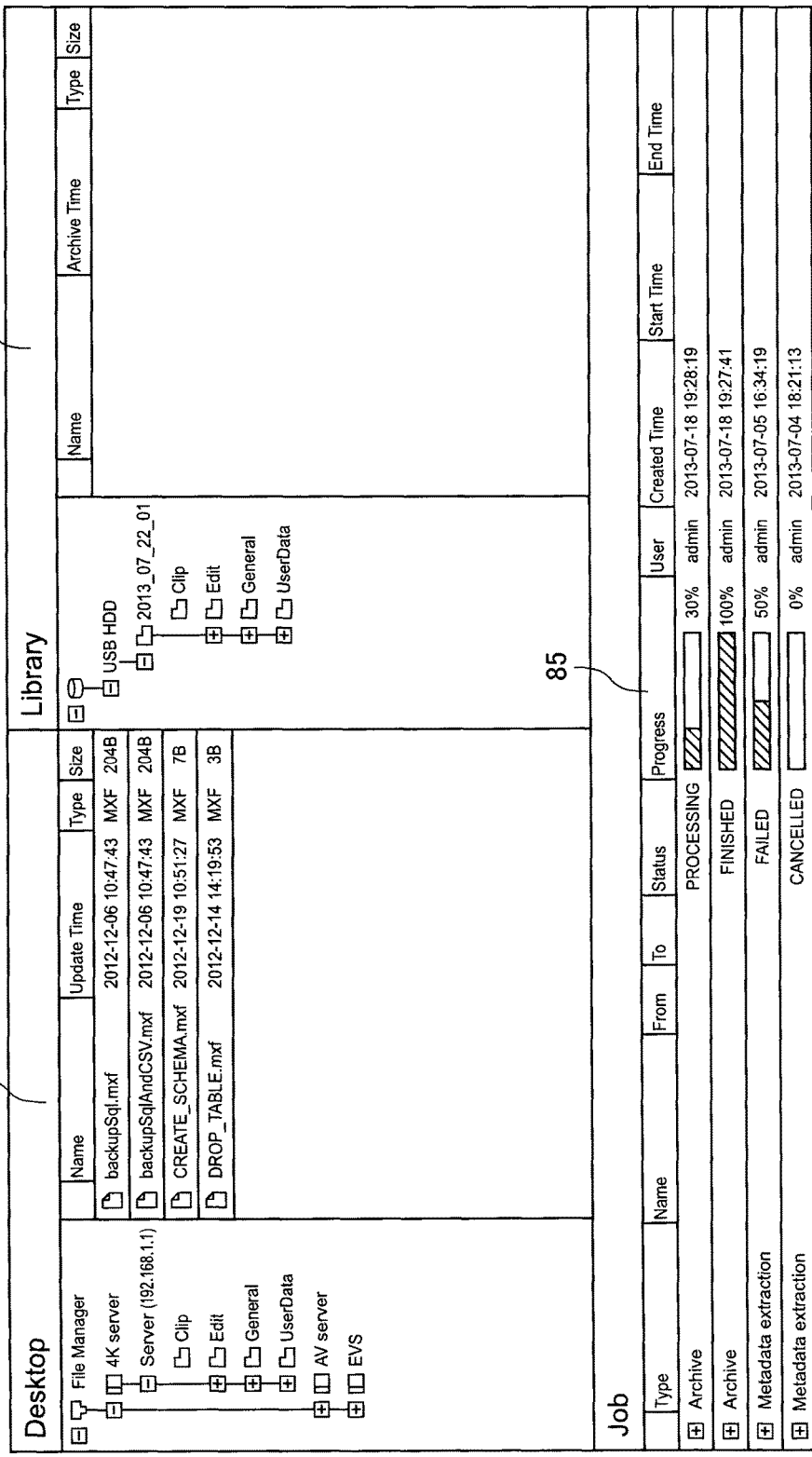
FIG. 9 is a view for describing a specific example of the operation screen on which information relating to transfer processing (job) of the clip is also displayed.

Here, in addition to the above-mentioned example of the operation screen, a specific example of an operation screen 81 in which information relating to clip transfer processing (job) is also displayed will be described. FIG. 9 is a view for explaining a specific example of the operation screen 81 in which the information relating to clip transfer processing (job) is also displayed.

As shown in this figure, in a left pane (second region) 82 and a right pane (third region) 83 of the figure, a list of clips of transfer sources and transfer destinations are displayed. Then, the state of the transfer job is displayed in a lower pane (job display region) 84 of the figure.

In this job display region (fourth region) 84, all jobs including terminated jobs in the information processing system 1 are displayed.

Now, items displayed in the job display region 84 and the meaning thereof will be described.

"+/− button" is an item displayed only at a row relating to a job group obtained by grouping the jobs. When "+ button" is clicked, all the jobs included in the job group are displayed. Note that, in the case where many jobs are included in the job group, the jobs are divided into 50 for each page in non-synchronization.

"× button" is a button indicating that a cancel instruction is received.

"Type" is an item indicating a job type.

"Name" is an item indicating a name (file name) of a catalog (one in which jobs are described) for performing processing of each job. At the row of the job group, nothing is displayed in this item.

"From" is an item displaying a server name and a path of the transfer source in processing performed by each job.

"To" is an item displaying a server name and a path of the transfer destination in processing performed by each job.

"Status" is an item showing a job state. In the case of the job group, five kinds of state of "PROCESSING," "FINISHED," "FAILED," "CANCELLED," and "Partially finished" are displayed.

"PROCESSING" indicates that at least one job is under execution. "FINISHED" indicates that all the jobs in the job group are completed. "FAILED" indicates that all the jobs in the job group are abnormally terminated.

"CANCELLED" indicates that all the jobs in the job group are cancelled. "Partially finished" indicates that the job in the job group is completed, abnormally terminated, or cancelled and one or more jobs are completed.

"Progress" is an item (progress display unit) 85 indicating the progress by the use of a progress bar when the clip is being written (archive) on the removable recording medium 30 or the clip is being read (retrieve) from the removable recording medium 30. Note that, in the case of the job group, the progress of all the jobs in the job group is displayed.

"User" is an item indicating a user name of a user that has performed the job.

"Generated Time" is an item indicating a point of time at which the job is generated (archive or retrieve instruction is issued). In the case of the job group, a point of time at which the job group is generated is shown. In the job group, all the job should be generated at the same point of time, and hence a point of time at which the job is generated is displayed as a point of time of generation of the job group.

"Start Time" is an item indicating a point of time at which execution of the job is started. In the case of the job group, a start point of time of the job first started among the jobs within the job group is displayed.

"End Time" is an item indicating a point of time of completion of the job. In the case of the job group, a time of completion of the job first completed among the jobs within the job group is displayed.

Note that, by clicking an item name portion of a column of each column, a list of jobs is displayed with that item being a key, in a sorted state in ascending order or in descending order. During sorting, the arrow is displayed next to the item name of the column used as the key. Note that, in an initial state in which sorting using a particular item name as a key is not performed, a list of jobs is displayed in a sorted state in descending order based on the item of "Create Time" in an order in which the job is injected, that is, such that a more newly injected job is an earlier order.

The specific example of the operation screen in which the information relating to the transfer processing (job) of the clip is also displayed has been described.

[Specific Example of Clip Transfer]

Figure 10:
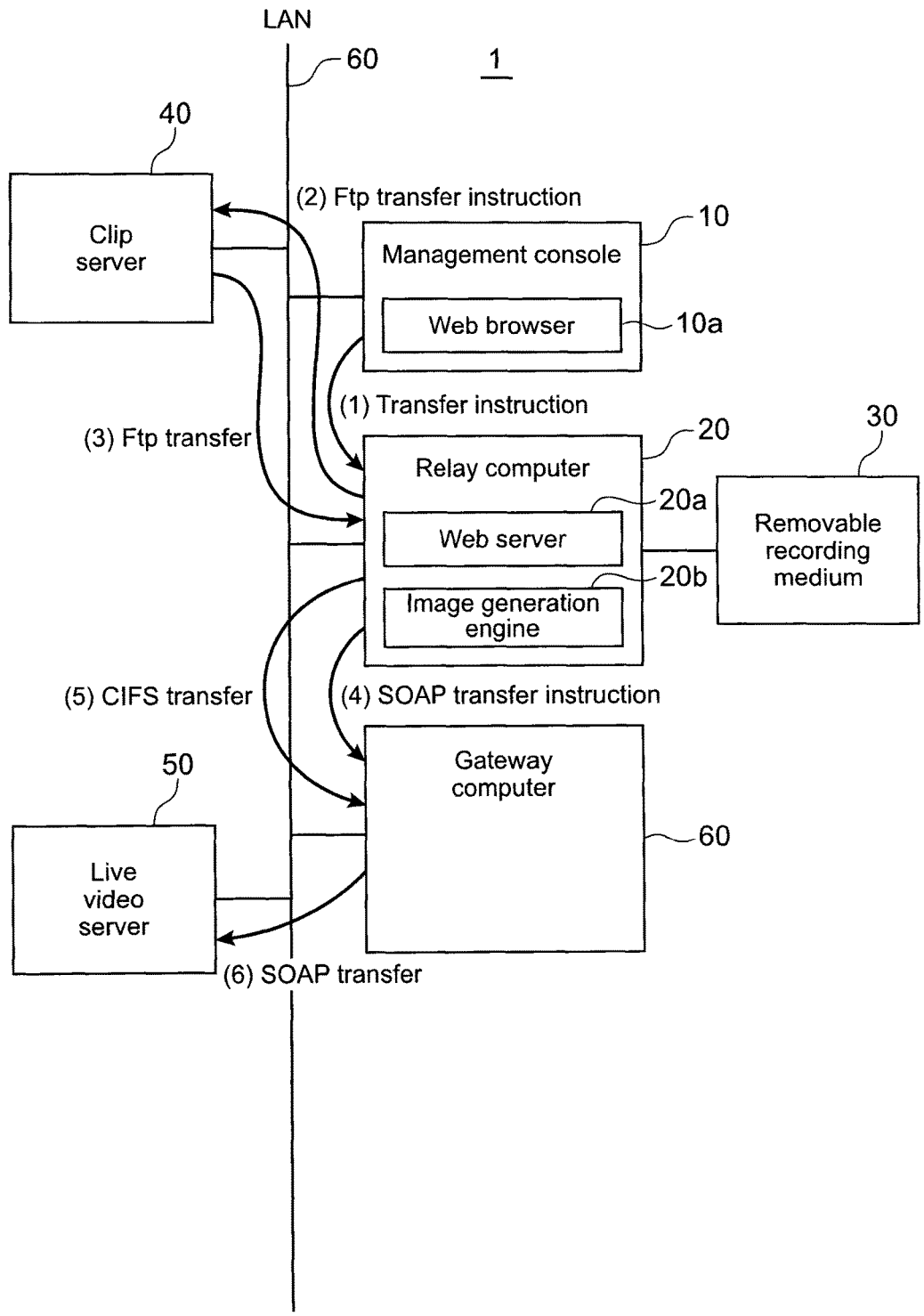
FIG. 10 is a view for describing a specific example relating to transfer of the clip.

Next, a specific example relating to clip transfer will be described. FIG. 10 is a view for describing a specific example relating to the clip transfer. Note that, in this figure, based on a configuration diagram of the above-mentioned information processing system 1, a gateway computer 60 serving as a gateway between the relay computer 20 and the live video server 50 is added.

The clip transfer from the clip server 40 to the live video server 50 is performed in the following procedure.

(1) The user instructs to transfer a clip from the clip server 40 to the live video server 50 on the operation screen of the management console 10. The transfer instruction is issued from the management console 10 to the relay computer 20. Note that, instead of issuing the instruction from the management console 10, the user may cause the display unit 26 of the relay computer 20 to display the operation screen and issue the transfer instruction to the relay computer 20 therefrom.

(2) Subsequently, the relay computer 20 logs in the clip server 40 by file transfer protocol (ftp) and issues a clip transfer instruction by a ftp command.

(3) Subsequently, the ftp transfer of the clip from the clip server 40 to the relay computer 20 is performed. The ftp-transferred clip is stored in the storage unit 27 of the relay computer 20.

(4) Subsequently, the relay computer 20 issues a SOAP transfer instruction of that clip to the gateway computer 60.

(5) Subsequently, the gateway computer 60 performs the clip transfer from the storage unit 27 of the relay computer 20 to the gateway computer 60 by a common internet file system (CIFS) according to the SOAP transfer instruction.

(6) Finally, the gateway computer 60 performs the clip transfer from the gateway computer 60 to the live video server 50.

The specific example relating to the clip transfer has been described.

[Other Configurations of Present Technology]

Note that the present technology may also take the following configurations.

(1) An information processing apparatus, including:
a control unit configured to
acquire and output information of an operation screen on a display unit from a relay apparatus storing the information of the operation screen, the relay apparatus being configured to relay at least one moving image from a moving image server, in which the moving image is stored, to a different device via a network, the operation screen being used to operate the relay apparatus and including a region for arranging a thumbnail image of the moving image, the information being described in a structured language,
request the thumbnail image to be arranged in the region of the operation screen to the relay apparatus,
arrange the acquired thumbnail image in the region if the thumbnail image requested is acquired, and
request a thumbnail image the acquisition of which fails until the acquisition is succeeded if the acquisition is failed due to the fact that the thumbnail image is not present.

(2) The information processing apparatus according to (1), in which
the control unit is configured to output, if the acquisition is failed, an alternative image to the operation screen until the acquisition is succeeded and the acquired thumbnail image is outputted to the operation screen.

(3) The information processing apparatus according to (1) or (2), in which
the control unit is configured to request a thumbnail image the acquisition of which fails, at time intervals defined in advance.

(4) The information processing apparatus according to any one of (1) to (3), wherein
the control unit starts the relay based on a GUI operation defined in advance with respect to the thumbnail image on the operation screen.

(5) A relay apparatus of relaying at least one moving image from a moving image server storing the moving image to a different device, which is configured to determine whether or not a thumbnail image to be arranged in a region of an operation screen is present, and generate the thumbnail image from the moving image if it is not present when information of an operation screen described in a structured language and including a first region for arranging a thumbnail image of the moving image is outputted.

(6) The relay apparatus according to (5), in which the thumbnail image is generated and stored from the moving image when the moving image is relayed between the moving image server and the different device.

(7) The relay apparatus according to (5) or (6), in which
the different device is a removable recording medium to the relay apparatus.

(8) The relay apparatus according to (5) or (6), in which
the different device is a live video server configured to store a moving image for live broadcasting that is connectable to the relay apparatus via a network.

(9) The relay apparatus according to any one of (5) to (8), in which
the operation screen includes
a second region in which a list of moving images stored in the moving image server is displayed, and
a third region configured to display a list of moving images stored in the different device, and
a fourth region in which a relay state of the moving image is displayed.

(10) The relay apparatus according to (9), in which
the fourth region includes
at least one progress display unit configured to indicate a progress on the difference device in a relay processing per moving image.

(11) An information processing system, including:
a moving image server storing at least one moving image;
a relay apparatus configured to relay the moving image from a moving image server to a different device and to store information of an operation screen being used to operate the relay apparatus and including a region for arranging a thumbnail image of the moving image, the information being described in a structured language; and
an information processing apparatus including a control unit configured to
acquire and output the information of the operation screen on a display unit from the relay apparatus,
request the thumbnail image to be arranged in the region of the operation screen to the relay apparatus,
arrange the acquired thumbnail image in the region if the thumbnail image requested is acquired, and
request a thumbnail image the acquisition of which fails until the acquisition is succeeded if the acquisition is failed due to the fact that the thumbnail image is not present.

(12) An information processing program for causing a computer to function as a control unit configured to
acquire and output information of an operation screen on a display unit from a relay apparatus storing the information of the operation screen, the relay apparatus being configured to relay at least one moving image from a moving image server, in which the moving image is stored, to a different device via a network, the operation screen being used to operate the relay apparatus and including a region for arranging a thumbnail image of the moving image, the information being described in a structured language,
request the thumbnail image to be arranged in the region of the operation screen to the relay apparatus,
arrange the acquired thumbnail image in the region if the thumbnail image requested is acquired, and
request a thumbnail image the acquisition of which fails until the acquisition is succeeded if the acquisition is failed due to the fact that the thumbnail image is not present.

[Supplementary Note]

Of Course, the present technology is not limited only to the above-mentioned embodiments and may be variously modified without departing from the gist of the present technology.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a central processor coupled with a memory storing instructions and a network interface via a bus, the central processor to execute the instructions, wherein the instructions, when executed, cause the information processing apparatus to:
acquire and output information of an operation screen on a display from a relay apparatus storing the information of the operation screen, the relay apparatus being configured to relay at least one moving image from a moving image server, in which the at least one moving image is stored, to a different device via a network, the different device being one of a removable recording medium and a live video server, the operation screen being used to operate the relay apparatus and including at least (1) a first region for arranging a thumbnail image of the at least one moving image, the information being described in a structured language, (2) a second region in which a list of moving images stored in the moving image server is displayed, (3) a third region in which another list of moving images stored in the different device is displayed, and (4) a fourth region in which a relay state of the at least one moving image is displayed, the fourth region including at least one progress display configured to indicate a progress on the different device in a relay processing per a moving image, the fourth region including a button to cancel the instructions and a status field configured to support at least five different textual terms, a first textual term indicating that a job is under execution, a second textual term indicating that all jobs of a job group are completed, a third textual term indicating that all jobs of the job group are abnormally terminated, a fourth textual term indicating that all jobs of the job group are canceled, and a fifth textual term indicating that a job of the job group is abnormally terminated and one or more jobs of the job group are completed,
request the thumbnail image to be arranged in the first region of the operation screen to the relay apparatus,
start a web page full screen drawing based on the requested thumbnail image,
repeatedly re-request the thumbnail image to the relay apparatus and the requested thumbnail image not being present, upon which deliberately no error is displayed,
acquire the requested thumbnail image after a sleep to wait for a completion of generation of the requested thumbnail image in the relay apparatus, and
complete the web page full screen drawing based on the acquired thumbnail image.

2. The information processing apparatus according to claim 1, wherein
the instructions, when executed, cause the information processing apparatus to output, when the requested thumbnail image is not acquired, an alternative image to the operation screen until the acquisition is succeeded and the acquired thumbnail image is outputted to the operation screen.

3. The information processing apparatus according to claim 2, wherein
the instructions, when executed, cause the information processing apparatus to request the thumbnail image the acquisition of which fails, at time intervals defined in advance.

4. The information processing apparatus according to claim 3, wherein
the instructions, when executed, cause the information processing apparatus to start the relay based on a graphical user interface (GUI) operation defined in advance with respect to the thumbnail image on the operation screen.

5. An information processing system, comprising:
a moving image server storing at least one moving image;
a relay apparatus configured to relay the at least one moving image from the moving image server to a different device via a network, the different device being one of a removable recording medium and a live video server and store information of an operation screen being used to operate the relay apparatus and including at least (1) a first region for arranging a thumbnail image of the at least one moving image, the information being described in a structured language, (2) a second region in which a list of moving images stored in the moving image server is displayed, (3) a third region in which another list of moving images stored in the different device is displayed, and (4) a fourth region in which a relay state of the at least one moving image is displayed, the fourth region including at least one progress display configured to indicate a progress on the different device in a relay processing per a moving image, the fourth region including a button to cancel instructions and a status field configured to support at least five different textual terms, a first textual term indicating that a job is under execution, a second textual term indicating that all jobs of a job group are completed, a third textual term indicating that all jobs of the job group are abnormally terminated, a fourth textual term indicating that all jobs of the job group are canceled, and a fifth textual term indicating that a job of the job group is abnormally terminated and one or more jobs of the job group are completed; and
an information processing apparatus including a central processor coupled with a memory storing the instructions and a network interface via a bus, the central processor to execute the instructions, wherein the instructions, when executed, cause the information processing apparatus to:
acquire and output the information of the operation screen on a display from the relay apparatus,
request the thumbnail image to be arranged in the first region of the operation screen to the relay apparatus,
start a web page full screen drawing based on the requested thumbnail image,
repeatedly re-request the thumbnail image to the relay apparatus and the requested thumbnail image not being present, upon which deliberately no error is displayed,
acquire the requested thumbnail image after a sleep to wait for a completion of generation of the requested thumbnail image in the relay apparatus, and
complete the web page full screen drawing based on the acquired thumbnail image.

6. A non-transitory computer readable medium storing computer readable instructions thereon that, when executed by a computer, causes the computer to perform a method comprising:
acquiring and outputting information of an operation screen on a display from a relay apparatus storing the information of the operation screen, the relay apparatus being configured to relay at least one moving image from a moving image server, in which the at least one moving image is stored, to a different device via a network, the different device being one of a removable recording medium and a live video server, the operation screen being used to operate the relay apparatus and including at least (1) a first region for arranging a thumbnail image of the at least one moving image, the information being described in a structured language, (2) a second region in which a list of moving images stored in the moving image server is displayed, (3) a third region in which another list of moving images stored in the different device is displayed, and (4) a fourth region in which a relay state of the at least one moving image is displayed, the fourth region including at least one progress display configured to indicate a progress on the different device in a relay processing per a moving image, the fourth region including a button to cancel the instructions and a status field configured to support at least five different textual terms, a first textual term indicating that a job is under execution, a second textual term indicating that all jobs of a job group are completed, a third textual term indicating that all jobs of the job group are abnormally terminated, a fourth textual term indicating that all jobs of the job group are canceled, and a fifth textual term indicating that a job of the job group is abnormally terminated and one or more jobs of the job group are completed, requesting the thumbnail image to be arranged in the first region of the operation screen to the relay apparatus, starting a web page full screen drawing based on the requested thumbnail image, repeatedly re-requesting the thumbnail image to the relay apparatus and the requested thumbnail image not being present, upon which deliberately no error is displayed, acquiring the requested thumbnail image after a sleep to wait for a completion of generation of the requested thumbnail image in the relay apparatus, and completing the web page full screen drawing based on the acquired thumbnail image.

\* \* \* \* \*